United States Patent
Thompson

(10) Patent No.: US 9,930,103 B2
(45) Date of Patent: Mar. 27, 2018

(54) ENDPOINT MANAGEMENT SYSTEM PROVIDING AN APPLICATION PROGRAMMING INTERFACE PROXY SERVICE

(71) Applicant: Amazon Technologies, Inc., Seattle, WA (US)

(72) Inventor: Jonathan Paul Thompson, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 204 days.

(21) Appl. No.: 14/682,033

(22) Filed: Apr. 8, 2015

(65) Prior Publication Data

US 2016/0301739 A1 Oct. 13, 2016

(51) Int. Cl.
| | | |
|---|---|---|
| G06F 15/16 | (2006.01) | |
| H04L 29/08 | (2006.01) | |
| G06F 9/54 | (2006.01) | |

(52) U.S. Cl.
CPC ............. *H04L 67/10* (2013.01); *G06F 9/541* (2013.01); *G06F 9/547* (2013.01); *H04L 67/2804* (2013.01)

(58) Field of Classification Search
CPC ......... G06F 9/541; G06F 9/547; H04L 67/10; H04L 67/2804
(Continued)

(56) References Cited

U.S. PATENT DOCUMENTS

| | | |
|---|---|---|
| 5,283,888 A | 2/1994 | Dao et al. |
| 5,970,488 A | 10/1999 | Crowe et al. |

(Continued)

FOREIGN PATENT DOCUMENTS

| | | |
|---|---|---|
| EP | 2663052 A1 | 11/2013 |
| WO | WO 2009/137567 A1 | 11/2009 |

(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

(Continued)

*Primary Examiner* — Moustafa M Meky
*Assistant Examiner* — Thorne E Waugh
(74) *Attorney, Agent, or Firm* — Knobbe, Martens, Olson & Bear, LLP

(57) ABSTRACT

An endpoint management and proxy system is described, by which users can manage and enable exposure of application programming interfaces ("APIs") usable to cause execution of program code on a remote or third party system. Systems and methods are disclosed which facilitate the handling of user requests to perform certain tasks on remote systems. The endpoint management system allows the application developer to define and specify a first proxy API which maps to a second API associated with the remote system. The endpoint proxy system receives requests to execute the proxy API, determines the API mapping, and sends one or more backend API requests to execute program codes by the associated remote systems. Responses from the remote systems are received by the endpoint proxy system which parses and/or transforms the results associated with the response and generates an output result for response back to the user computing systems.

23 Claims, 6 Drawing Sheets

(58) Field of Classification Search
USPC .................................................. 709/203–248
See application file for complete search history.

(56) References Cited

U.S. PATENT DOCUMENTS

| | | |
|---|---|---|
| 6,708,276 B1 | 3/2004 | Yarsa et al. |
| 7,036,121 B1 | 4/2006 | Casabona et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 * | 11/2011 | Mazzaferri ............ G06F 3/1415 709/227 |
| 8,051,266 B2 | 11/2011 | DeVal et al. |
| 8,065,676 B1 | 11/2011 | Sahai et al. |
| 8,095,931 B1 | 1/2012 | Chen et al. |
| 8,146,073 B2 | 3/2012 | Sinha |
| 8,166,304 B2 | 4/2012 | Murase et al. |
| 8,171,473 B2 | 5/2012 | Lavin |
| 8,219,987 B1 | 7/2012 | Vlaovic et al. |
| 8,321,554 B2 | 11/2012 | Dickinson |
| 8,336,079 B2 | 12/2012 | Budko et al. |
| 8,429,282 B1 | 4/2013 | Ahuja |
| 8,448,165 B1 | 5/2013 | Conover |
| 8,613,070 B1 * | 12/2013 | Borzycki ............ G06F 21/6218 726/8 |
| 8,631,130 B2 | 1/2014 | Jackson |
| 8,694,996 B2 | 4/2014 | Cawlfield et al. |
| 8,719,415 B1 | 5/2014 | Sirota et al. |
| 8,725,702 B1 | 5/2014 | Raman et al. |
| 8,756,696 B1 * | 6/2014 | Miller .................... H04L 63/14 709/247 |
| 8,769,519 B2 | 7/2014 | Leitman et al. |
| 8,819,679 B2 | 8/2014 | Agarwal et al. |
| 8,825,964 B1 | 9/2014 | Sopka et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 6/2015 | Oh et al. |
| 9,092,837 B2 | 7/2015 | Bala et al. |
| 9,110,732 B1 | 8/2015 | Forschmiedt et al. |
| 9,112,813 B2 | 8/2015 | Jackson |
| 9,146,764 B1 | 9/2015 | Wagner |
| 9,183,019 B2 | 11/2015 | Kruglick |
| 9,208,007 B2 | 12/2015 | Harper et al. |
| 9,223,561 B2 | 12/2015 | Orveillon et al. |
| 9,223,966 B1 | 12/2015 | Satish et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 * | 10/2016 | Hayton ............... H04L 63/0815 |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,588,790 B1 | 3/2017 | Wagner et al. |
| 9,600,312 B2 | 3/2017 | Wagner et al. |
| 9,652,306 B1 | 5/2017 | Wagner et al. |
| 9,652,617 B1 | 5/2017 | Evans et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 2002/0172273 A1 | 11/2002 | Baker et al. |
| 2003/0071842 A1 | 4/2003 | King et al. |
| 2003/0084434 A1 | 5/2003 | Ren |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0132167 A1 | 6/2005 | Longobardi |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0184669 A1 | 8/2006 | Vaidyanathan et al. |
| 2006/0200668 A1 | 9/2006 | Hybre et al. |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0255604 A1 * | 11/2007 | Seelig .............. G06Q 10/06316 705/7.26 |
| 2008/0028409 A1 | 1/2008 | Cherkasova et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0189468 A1 | 8/2008 | Schmidt et al. |
| 2008/0201711 A1 | 8/2008 | Amir Husain |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204964 A1 | 8/2009 | Foley et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0099551 A1 | 4/2011 | Fahrig et al. |
| 2011/0134761 A1 | 6/2011 | Smith |
| 2011/0141124 A1 | 6/2011 | Halls et al. |
| 2011/0153838 A1 | 6/2011 | Belkine et al. |
| 2011/0154353 A1 | 6/2011 | Theroux et al. |
| 2011/0184993 A1 | 7/2011 | Chawla et al. |
| 2011/0265164 A1 | 10/2011 | Lucovsky |
| 2011/0314465 A1 | 12/2011 | Smith et al. |
| 2011/0321033 A1 | 12/2011 | Kelkar et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072914 A1 | 3/2012 | Ota |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |

(56) References Cited

U.S. PATENT DOCUMENTS

| | | |
|---|---|---|
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0080641 A1 | 3/2013 | Lui et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0151648 A1 | 6/2013 | Luna |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0205092 A1 | 8/2013 | Roy et al. |
| 2013/0219390 A1 | 8/2013 | Lee et al. |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0263117 A1 | 10/2013 | Konik et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0347095 A1 | 12/2013 | Barjatiya et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0380085 A1 | 12/2014 | Rash et al. |
| 2015/0052258 A1* | 2/2015 | Johnson ............... H04L 67/141 709/228 |
| 2015/0074659 A1* | 3/2015 | Madsen ................. G06F 8/61 717/177 |
| 2015/0081885 A1 | 3/2015 | Thomas et al. |
| 2015/0120928 A1 | 4/2015 | Gummaraju et al. |
| 2015/0178110 A1 | 6/2015 | Li et al. |
| 2015/0186129 A1 | 7/2015 | Apte et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0363181 A1 | 12/2015 | Alberti et al. |
| 2015/0371244 A1 | 12/2015 | Neuse et al. |
| 2015/0378764 A1 | 12/2015 | Sivasubramanian et al. |
| 2015/0378765 A1 | 12/2015 | Singh et al. |
| 2016/0012099 A1 | 1/2016 | Tuatini et al. |
| 2016/0072727 A1 | 3/2016 | Leafe et al. |
| 2016/0098285 A1 | 4/2016 | Davis et al. |
| 2016/0285906 A1 | 9/2016 | Fine et al. |
| 2016/0294614 A1* | 10/2016 | Searle .................. H04L 41/082 |
| 2016/0299790 A1 | 10/2016 | Thompson |
| 2016/0371127 A1 | 12/2016 | Antony et al. |
| 2017/0090961 A1 | 3/2017 | Wagner et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |

FOREIGN PATENT DOCUMENTS

| | | |
|---|---|---|
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |

OTHER PUBLICATIONS

Adapter Pattern, Wikipedia, https://en.wikipedia.org/w/index.php?title=Adapter_pattern&oldid=654971255, [retrieved May 26, 2016], 6 pages.

Ben-Yehuda et al., "Deconstructing Amazon EC2 Spot Instance Pricing", ACM Transactions on Economics and Computation 1.3, 2013, 15 pages.

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Hoffman, Auto scaling your website with Amazon Web Services (AWS)—Part 2, Cardinalpath, Sep. 2015, 15 pages.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php?title+Shim_(computing)&oldid+654971528, [retrieved on May 26, 2016], 2 pages.

Vaghani, S.B., Virtual Machine File System, ACM SIGOPS Operating Systems Review 44(4):57-70, Dec. 2010.

Vaquero, L., et al., Dynamically Scaling Applications in the cloud, ACM SIGCOMM Computer Communication Review 41(1):45-52, Jan. 2011.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2015/052810 dated Dec. 17, 2015.

International Preliminary Report on Patentability in PCT/US2015/052810 dated Apr. 4, 2017.

International Search Report and Written Opinion in PCT/US2015/052838 dated Dec. 18, 2015.

International Preliminary Report on Patentability in PCT/US2015/052838 dated Apr. 4, 2017.

International Search Report and Written Opinion in PCT/US2015/052833 dated Jan. 13, 2016.

(56) References Cited

OTHER PUBLICATIONS

International Preliminary Report on Patentability in PCT/US2015/052833 dated Apr. 4, 2017.
International Search Report and Written Opinion in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Search Report and Written Opinion in PCT/US2016/026514 dated Jun. 8, 2016.
International Search Report and Written Opinion in PCT/US2016/026520 dated Jul. 5, 2016.
International Search Report and Written Opinion in PCT/US2016/054774 dated Dec. 16, 2016.
International Search Report and Written Opinion in PCT/US2016/066997 dated Mar. 20, 2017.
International Search Report and Written Opinion in PCT/US/2017/023564 dated Jun. 6, 2017.

* cited by examiner

ENDPOINT MANAGEMENT SYSTEM PROVIDING AN APPLICATION PROGRAMMING INTERFACE PROXY SERVICE

CROSS-REFERENCE TO OTHER APPLICATIONS

The present application's Applicant previously filed the following U.S. patent application on Sep. 30, 2014:

| Application No. | Title |
| --- | --- |
| 14/502,992 | THREADING AS A SERVICE |

Further, the present application's Applicant is concurrently filing the following U.S. patent application on Apr. 8, 2015:

| Attorney Docket No. | Title |
| --- | --- |
| SEAZN.1099A | ENDPOINT MANAGEMENT SYSTEM AND VIRTUAL COMPUTE SYSTEM |

The disclosures of the above-referenced applications are hereby incorporated by reference in their entireties.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
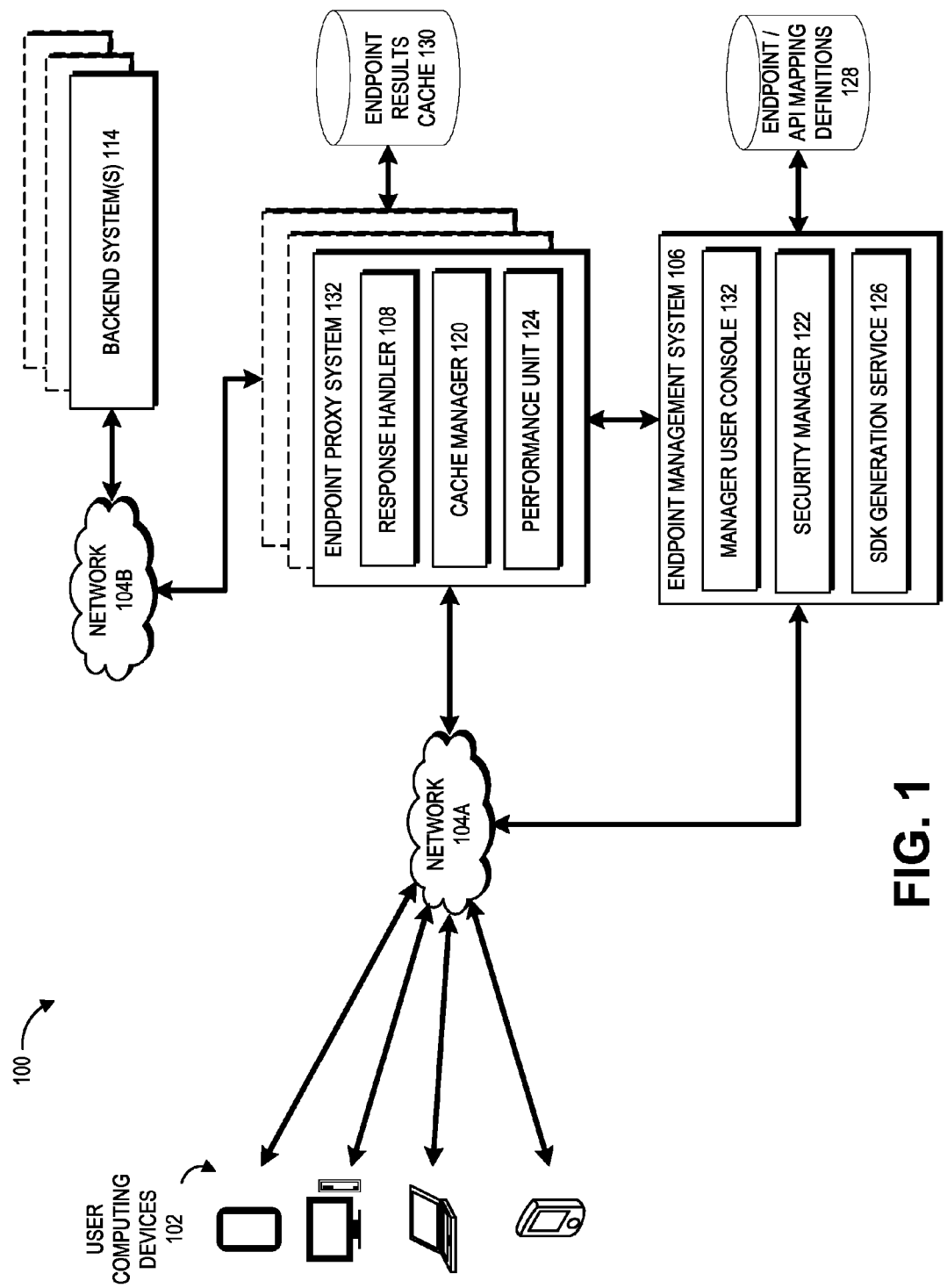
FIG. 1 is a block diagram depicting an illustrative environment for providing an application programming interface proxy service using an endpoint management system, according to an example aspect.

Generally described, aspects of the present disclosure describe an endpoint management system by which users, such as application developers, can manage and enable exposure of application programming interfaces ("APIs") usable to cause execution of program code on a remote or third party system. Specifically, systems and methods are disclosed which facilitate the handling of user requests to perform certain tasks on remote or third party systems. The endpoint management system allows the application developer to define and specify a first proxy API which maps to a second "backend" API associated with the remote or third party system. Remote or third party systems may include for example a system on a local network, a system on an open or publicly accessible network, a system which hosts one or more services such as a virtual compute environment, and so forth. Requests to execute the proxy API are received from user computing systems by the endpoint management system, which determines the API mapping based on the user-provided specification of various configuration options. The endpoint management system in turn generates and sends one or more backend API requests to execute program codes by the associated remote or backend systems. Responses from the remote or backend systems are received by the endpoint management system which can then analyze, parse, and/or transform the results associated with the response and generate an output result for response back to the user computing systems.

Thus, in embodiments described herein, a developer can describe an exposed API (e.g., a proxy API) and define logic and one or more endpoints (e.g., a backend API). For example, a cloud based "proxy" API may be called by a client device to the endpoint management system, where the endpoint management system knows which endpoints to select for the proxy API. The endpoints can be heterogeneous (e.g., web services, Internet of Things ("IoT") devices, other cloud-based service provider functions, datacenter functionality, and so on), and can also include other APIs. For example, a Representational State Transfer ("REST") API may be exposed which maps to a legacy SOAP-based API. In some embodiments a proxy fleet may be implemented as part of the endpoint management system to improve performance, efficiency, and scalability. Additional features described herein include the ability to chain or link multiple functionality or backend API calls (dependent or independent) based on a single proxy API call; additional security mechanisms for users of the endpoint management system to manage exposure of backend APIs and services; dynamic and intelligent caching of results returned from backend systems to improve efficiency and relieve remote and backend systems from performing repeat tasks which may yield results usable by multiple proxy APIs; performance management to protect remote and/or backend systems from being overloaded by a high volume of API requests, including user-configurable settings to throttle incoming requests (e.g., limit servicing of requests to a certain number in a given time period) and metering of received requests.

The endpoint management system may enable configuration of a proxy interface in a variety of protocol formats, including but not limited to Hypertext Transfer Protocol (HTTP), HTTP Secure ("HTTPS"), HTTP2, a REST API, a remote procedure call ("RPC"), a binary API, WebSockets, Message Queue Telemetry Transport ("MQTT"), Constrained Application Protocol ("CoAP"), Java Message Service ("JMS"), Advanced Message Queuing Protocol ("AMQP"), Simple (or Streaming) Text Oriented Message Protocol ("STOMP"), Electronic data interchange ("EDI"), Simple Mail Transfer Protocol ("SMTP"), Internet Message Access Protocol ("IMAP"), Post Office Protocol ("POP"), File Transfer Protocol ("FTP"), Open Database Connectivity ("ODBC"), Thrift, Protocol Buffers, Avro, Cap'n Proto, FlatBuffers, and other types of protocols. Some of these protocols describe a network and data format, and some may act as a container for other formats. Other data formats not implicit to the above listed protocols may include, for example: JavaScript Object Notation ("JSON"), Extensible Markup Language ("XML"), Simple Object Access protocol ("SOAP"), Hypertext markup language ("HTML"), comma separated values ("CSV"), tab separated values ("TSV"), INT file, YAML Ain't Markup Language ("YAML"), Binary JSON ("BSON"), MessagePack, Sereal, and Bencode. Any of the protocols and data formats may be used for either endpoint of an API proxy mapping in any combination. For example, a REST API may be mapped to a binary API; a HTTP API may be mapped to a remote procedure call; a first binary API may be mapped to a second binary API; and so on.

Specific embodiments and example applications of the present disclosure will now be described with reference to the drawings. These embodiments and example applications are intended to illustrate, and not limit, the present disclosure.

With reference to FIG. 1, a block diagram illustrating an embodiment of a computing environment 100 will be described. The example shown in FIG. 1 includes a computing environment 100 in which users of user computing devices 102 may access a variety of services provided by an endpoint management system 106, an endpoint proxy system 132, and backend systems 114 via a network 104A and/or a network 104B.

In the example of FIG. 1, various example user computing devices 102 are shown, including a desktop computer, laptop, a mobile phone, and a tablet. In general, the user computing devices 102 can be a wide variety of computing devices including personal computing devices, laptop computing devices, hand-held computing devices, terminal computing devices, mobile devices (e.g., mobile phones, smartphones, tablet computing devices, electronic book readers, etc.), wireless devices, various electronic devices and appliances, and the like. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. Other components of the computing environment 100 (e.g., endpoint management system 106) may provide the user computing devices 102 with one or more user interfaces, command-line interfaces (CLI), application programming interfaces (API), and/or other programmatic interfaces for utilizing one or more services offered by the respective components. Such services may include generating and uploading user codes, invoking the user codes (e.g., submitting a request to execute the user codes (e.g., via the endpoint proxy system 132), configuring one or more APIs (e.g., via the endpoint management system 106), caching results of execution of user codes and APIs, and/or monitoring API call usage for security, performance, metering, and other factors. Although one or more embodiments may be described herein as using a user interface, it should be appreciated that such embodiments may, additionally or alternatively, use any CLIs, APIs, or other programmatic interfaces.

The user computing devices 102 access endpoint proxy system 132 and/or the endpoint management system 106 over the network 104A. The endpoint proxy system 132 may comprise one or more servers or systems (e.g., a proxy fleet) which may be configured to manage execution of endpoint or backend APIs (e.g., as executed on the backend systems 114). The endpoint proxy system 132 may access other components of the computing environment 100, such as the backend systems 114 and an endpoint results cache 130 over the network 104B. The networks 104A and/or 104B may be any wired network, wireless network, or combination thereof. In addition, the networks 104A and/or 104B may be a personal area network, local area network, wide area network, over-the-air broadcast network (e.g., for radio or television), cable network, satellite network, cellular telephone network, or combination thereof. For example, the network 104A may be a publicly accessible network of linked networks, possibly operated by various distinct parties, such as the Internet. In some embodiments, the network 104B may be a private or semi-private network, such as a corporate or university intranet, or a publicly accessible network such as the Internet. In one embodiment, the network 104B may be co-located or located in close proximity to the endpoint proxy system 132, such that communication over the network 104B between the endpoint proxy system 132 and backend system(s) 114 may benefit from increased performance (e.g., faster and/or more efficient communication). The networks 104A and/or 104B may include one or more wireless networks, such as a Global System for Mobile Communications (GSM) network, a Code Division Multiple Access (CDMA) network, a Long Term Evolution (LTE) network, or any other type of wireless network. The network 104A and/or 104B can use protocols and components for communicating via the Internet or any of the other aforementioned types of networks. For example, the protocols used by the network 104A and/or 104B may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The computing environment 100 is depicted in FIG. 1 as operating in a distributed computing environment including several computer systems that are interconnected using one or more computer networks. The endpoint management system 106 and/or the endpoint proxy system 132 could also operate within a computing environment having a fewer or greater number of devices than are illustrated in FIG. 1. Thus, the depiction of the computing environment 100 in FIG. 1 should be taken as illustrative and not limiting to the present disclosure. For example, the computing environment 100 or various constituents thereof could implement various Web services components, hosted or "cloud" computing environments, and/or peer-to-peer network configurations to implement at least a portion of the processes described herein.

Further, the various components of the computing environment 100 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

As illustrated in FIG. 1, the endpoint proxy system 132 includes a response handler 108, a cache manager 120, and a performance unit 124. The response handler 108 may be configured to, for example, receive requests from calling systems (including, for example, user devices 102) to execute proxy APIs which correspond to one or more APIs to be called or invoked on one or more backend system(s) 114. The response handler 108 may be in communication with and access an endpoint/API mapping definitions data source 128 to look up API mapping definition for a received request. The response handler 108 can, based at least in part on the API mapping definition, determine a backend API (or APIs) and backend system(s) to be used to service the request. The response handler 108 may also be configured to parse and/or analyze the request and any associated input parameters provided with the request, and determine based on the API mapping definition any appropriate data transformations and mappings of the associated input parameters to input parameters for the backend API. In some embodiments the response handler 108 may check with the cache manager 120 to determine whether a cached result for the proxy API request is available, as will be described in more detail below. The response handler 108 may then send the transformed API request to the appropriate backend system (s) 114 and in turn receive a result back in response. The response handler 108 may in turn parse and/or transform the result into an output result for response to the original calling system, and provide the output result. The result may be parsed and/or transformed based in part on the API mapping definition. The result may also be provided to the cache manager 120 for further handling as described herein.

The cache manager 120 may be configured to manage results received from backend system(s) 114 in association with backend API requests in a number of ways. The cache manager 120 may be in communication with an endpoint results cache 130, where results received from backend system(s) 114 in association with backend API requests may be stored and accessed for future API proxy requests. Cached results may include both original backend API result from a backend system(s) 114, as well as a transformed or output result after the original backend API result is processed by the response handler 108.

The caching of results may be performed based at least in part on the API mapping definition. For example, the API mapping definition may include a user-provided configuration setting to specify whether results from a backend API should be cached and, if so, for how long. Thus a developer may indicate that results from a particular backend API may be cached for a period of time (e.g., seconds, minutes, hours, days, weeks, months, years, or any other amount of time). As described above with reference to the response handler 108, when a proxy API request is received and processed, the cache manager 120 may perform a cache check to determine whether cached results are available, valid, and/or otherwise unexpired (e.g., past the cache duration). If cached results are available, the cache manager 120 may access and retrieve them from the endpoint results cache 130 and provide them to the response handler 108.

As referenced above, the cache manager 120 may cache results from backend API calls in a number of ways. For example, in certain embodiments, if a first API call is received multiple times by the endpoint proxy system 132 and a cached result for a first backend API is available, then a copy of the cached result may be provided without the need to send the associated first backend API request to the respective backend system 114 again or multiple times with the cache duration period of time. In another embodiment, a second proxy API call may be received by the endpoint proxy system 132 which maps to the same backend API as the first proxy API call, in which case the response handler 108 and/or cache manager 120 may determine that the same cached result may be provided without the need to send the associated backend API request to the respective backend system 114. In yet another example, the second proxy API call may map to a second backend API which nevertheless returns the same result, or a portion of the same result, as the first backend API. In such a scenario the same cached result (or the relevant portion thereof) may be provided without the need to send the associated second backend API request to the respective backend system 114.

As an illustrative example of the flexible and dynamic caching feature described above, consider a first backend API which provides a result comprising a set of records including a name, a telephone number, and a mailing address for respective individuals; and a second backend API which provides a result comprising a mailing address for a particular individual. If a first proxy API call is received and processed to perform the first backend API, then the set of records may be cached by the cache manager 120. Subsequently, if the first proxy API call is received again, then the cached set of records may be accessed instead of issuing a request to the backend system(s) 114. In addition, if a second proxy API call is received corresponding to the second backend API requesting a mailing address for a particular individual, then the cached set of records may also be accessed to provide an output result to the calling system instead of issuing a request to the backend system(s) 114 to execute the second proxy API call. Thus, it may be possible to pre-emptively cache results for a backend API call without the need to call that backend API, for example if the cached results are cumulative of overlapping with another backend API call.

The performance unit 124 may be configured to manage performance related aspects involving backend API requests sent to backend system(s) 114. For example, the API mapping definition may include a user-provided configuration setting to specify a limit or frequency for how often a backend API may be called. This feature may be of benefit when a backend system 114 may be a legacy system or one that is outdated, under-performing or less efficient, or overburdened with servicing backend API requests. Thus for example a user can specify that a certain backend API may be called only a certain number of times over a certain length of time (e.g., 100 times per minute, 10 times per hour, or any other frequency); or a certain number of times over a certain time period (e.g., to throttle requests received during peak service hours).

Another performance configuration option that may be provided and utilized in association with the performance unit 124 is a setting to specify whether a metering identifier is required or to be used to track or monitor calling systems' use of the backend APIs. Such metering information may be of benefit to enable visibility into which proxy API and/or backend APIs are called, how often, and by which calling system.

As illustrated in FIG. 1, the endpoint management system 106 includes a manager user console 132, a security manager 122, and a Software Developer Kit ("SDK") generation service 126. The manager user console 132 may provide one or more user interfaces by which users, such as system administrators and/or developers, can manage, for example, API proxy settings including API mapping definitions, caching options, performance options, and security options. One example endpoint management user interface which may be generated and provided by the manager user console 132 is example user interface 300 illustrated and described herein with reference to FIG. 3. Users may access the manager user console 132 and related user interfaces over the network 104A (e.g., when the network 104A is configured as a public network) or over the network 104B (e.g., when the network 104B is configured as a private network), for example using a user computing device 102. For example, the manager user console 132 may provide a web, mobile, standalone, or other application which may be accessed or installed on a user computing device 102 and configured to communicate with the endpoint management system 106. API mapping definitions created and revised by users via the endpoint management system 106 may be stored in the endpoint/API mapping definitions data source 128. The endpoint management system 106 may be configured to publish, push, or otherwise transmit various of the API mapping definitions to the endpoint proxy system 132, which may use the API definitions for various response handling and related procedures described herein.

The security manager 122 may be configured to manage security and access to backend system(s) 114 and backend APIs. For example, the API mapping definition may include a user-provided configuration setting to specify whether only certain user(s) or group(s) may be allowed to call the backend API. A proxy API request may include an indicator (or security token) associated with a requesting user or group and, based on the API mapping definition, the security manager 122 may determine whether the request should be allowed or denied. If the calling system (e.g., a user computing device 102) provides an indicator or security token that maps to a user or group that is allowed to call the backend API, then the security manager 122 may indicate to the response handler 108 that processing of the request can proceed. If the calling system fails to provide an indicator or security token, or provides an indicator or security token that does not map to a user or group that is allowed to call the backend API, then the security manager 122 may indicate to the response handler 108 that processing of the request should stop (in which case a return indicator may optionally be provided by the endpoint proxy system 132 to indicate that the request was denied due to lack of authorization). In this way, for example, a developer may safeguard or limit access to certain backend APIs.

The endpoint management system 106 may also include an SDK generation service 126 to enable users to generate an SDK based on one or more API mapping definitions. This feature may be of particular benefit to users of the endpoint management system 106 who have invested considerable time and effort in mapping a suite of legacy backend APIs to a new set of proxy APIs. An SDK may be generated based on the API mapping definitions and provided to other users (such as system developers who wish to interface with or use a backend system 114 using more modern API protocols) to facilitate development of other applications and services which utilize the backend system(s) 114 via the suite of proxy APIs.

An example configuration which may be used to implement the various subsystems and units of the endpoint management system 106 and/or endpoint proxy system 132 is described in greater detail below with reference to FIG. 2.

As shown in FIG. 1, the endpoint management system 106 communicates with the endpoint proxy fleet 123A . . . N. For example, a first proxy server may be configured to manage execution of a first proxy API; a second proxy server may be configured to manage execution of a second proxy API; and an nth proxy server may be configured to manage execution of an nth proxy API. Or, one proxy server may be configured to manage execution of multiple proxy APIs which may be related or grouped together, for example based in part on similarity of backend APIs, cumulative or overlapping results obtained from backend system(s) 114 for associated backend APIs, and so on. Each proxy server in the fleet of proxy servers may be configured for performance or efficiency with respect to particular tasks or backend systems. For example, a proxy server may be configured for efficient performance and execution of proxy APIs which involve database queries, while another proxy server may be configured for efficient performance and execution of proxy APIs which involve significant data transformation of backend API results to output results.

In the example of FIG. 1, the endpoint proxy system 132 is illustrated as being connected to the network 104A and the network 104B. In some embodiments, any of the components within the endpoint proxy system 132 can communicate with other components (e.g., the user computing devices 102 and backend system(s) 114) of the computing environment 100 via the network 104A and/or network 104B. In other embodiments, not all components of the endpoint proxy system 132 are capable of communicating with other components of the computing environment 100. In one example, only the response handler 108 may be connected to the network 104A, and other components of the endpoint proxy system 132 may communicate with other components of the computing environment 100 via the response handler 108.

In the example of FIG. 1, the endpoint management system 106 is illustrated as being connected to the network 104A. In some embodiments, any of the components within the endpoint management system 106 can communicate with other components (e.g., the user computing devices 102 and backend system(s) 114) of the computing environment 100 via the network 104A and/or network 104B. In other embodiments, not all components of the endpoint management system 106 are capable of communicating with other components of the computing environment 100. In one example, only the manager user console 132 may be connected to the network 104A, and other components of the endpoint management system 106 may communicate with other components of the computing environment 100 via the manager user console 132.

The backend system(s) 114 may include legacy systems that have protocols that are not compatible with those of the user computing devices 102 or otherwise not easily accessible by the user computing devices 102. The backend system(s) 114 may also include devices that have device-specific protocols (e.g., IoT devices).

In some embodiments, the endpoint proxy system 132 provides to the user computing devices 102 a more convenient access to the backend system(s) 114 or other systems or devices. In some of such embodiments, the endpoint proxy system 132 may communicate with an IoT device with device-specific protocols. For example, the IoT device may have a temperature sensor, and the user can request temperature information from the IoT device. In another example, the IoT device may be a thermostat and the user may be able to cause it to set the temperature to a given temperature. Depending on what the device is, it can have different capabilities. All those capabilities may be managed by some type of API (e.g., backend API) that would exist for manipulating the capability. The endpoint proxy system 132 may perform the necessary protocol translation and/or data manipulation to allow users to seamlessly communicate with such IoT devices without having to worry about device-specific protocols or requirements. For example, the endpoint proxy system 132 may query the IoT devices for data or send commands to the IoT devices. The responses received from those IoT devices may be used to shape the response back to the caller based on the requirements of the caller.

Figure 2:
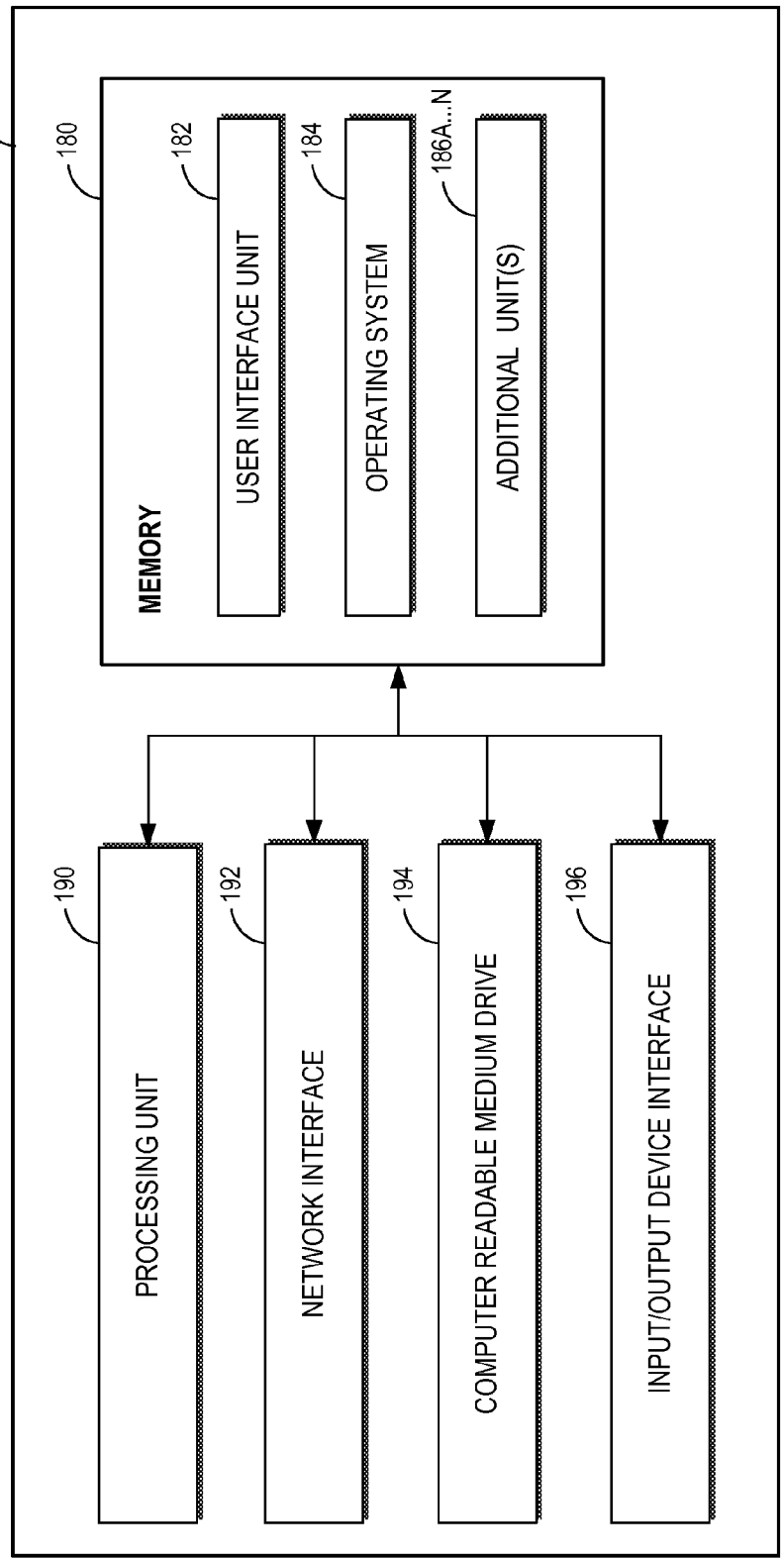
FIG. 2 depicts a general architecture of a computing device which may be implemented to enable various features for various subsystems and units of the endpoint management system, according to an example aspect.

FIG. 2 depicts a general architecture of a computing device 106A that which may be implemented to enable various features of the various subsystems and units of the endpoint management system, including but not limited to the response handler 108, the cache manager 120, the security manager 122, the performance unit 124, and the SDK generation service 126. The general architecture of the computing device 106A depicted in FIG. 2 includes an arrangement of computer hardware and software modules that may be used to implement aspects of the present disclosure. The computing device 106A may include many more (or fewer) elements than those shown in FIG. 2. It is not necessary, however, that all of these generally conventional elements be shown in order to provide an enabling disclosure. As illustrated, the computing device 106A includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104A or 104B. The processing unit 190 may also communicate to and from the memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the response handler 108. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. For example, the user interface unit 182 may generate one or more endpoint management configuration user interfaces such as the example user interface 300 illustrated and described herein with reference to FIG. 3. Although the example of FIG. 2 is described in the context of user interfaces, it should be appreciated that one or more embodiments described herein may be implemented using, additionally or alternatively, any CLIs, APIs, or other programmatic interfaces. In addition, the memory 180 may include and/or communicate with one or more data repositories (not shown), for example, to access program codes, pattern matching definitions, and/or libraries.

In addition to and/or in combination with the user interface unit 182, the memory 180 additional units 186A . . . N that may be executed by the processing unit 190 to provide the various features associated with particular instances of the subsystems and units of the endpoint management system 106 and/or endpoint proxy fleet 132. For example, the response handler 108 may include a response parsing unit that may be executed to parse responses or results received from backend system(s) 114. The cache manager 120 may include a caching unit that may be executed to determine whether to cache results received from backend system(s) 114, and whether cached results should be used to respond to certain proxy API requests. The security manager 122 may include an authorization unit that may be executed to determine whether a proxy API request has proper security identification and should be allowed to proceed. The performance unit 124 may include a throttle unit that may be executed to determine whether a proxy API request should be allowed to proceed under current demand conditions. The SDK generation service 126 may include an API mapping analysis unit that may be executed to aggregate a set of API mapping definitions into a unified SDK library.

In various embodiments, all or a portion of the additional units 186A . . . N may be implemented by other components of the endpoint management system 106, the endpoint proxy system 132, and/or another computing device. For example, in certain embodiments of the present disclosure, another computing device in communication with the endpoint management system 106 and/or the endpoint proxy system 132 may include several modules or components that operate similarly to the modules and components illustrated as part of the computing device 106A.

Figure 3:
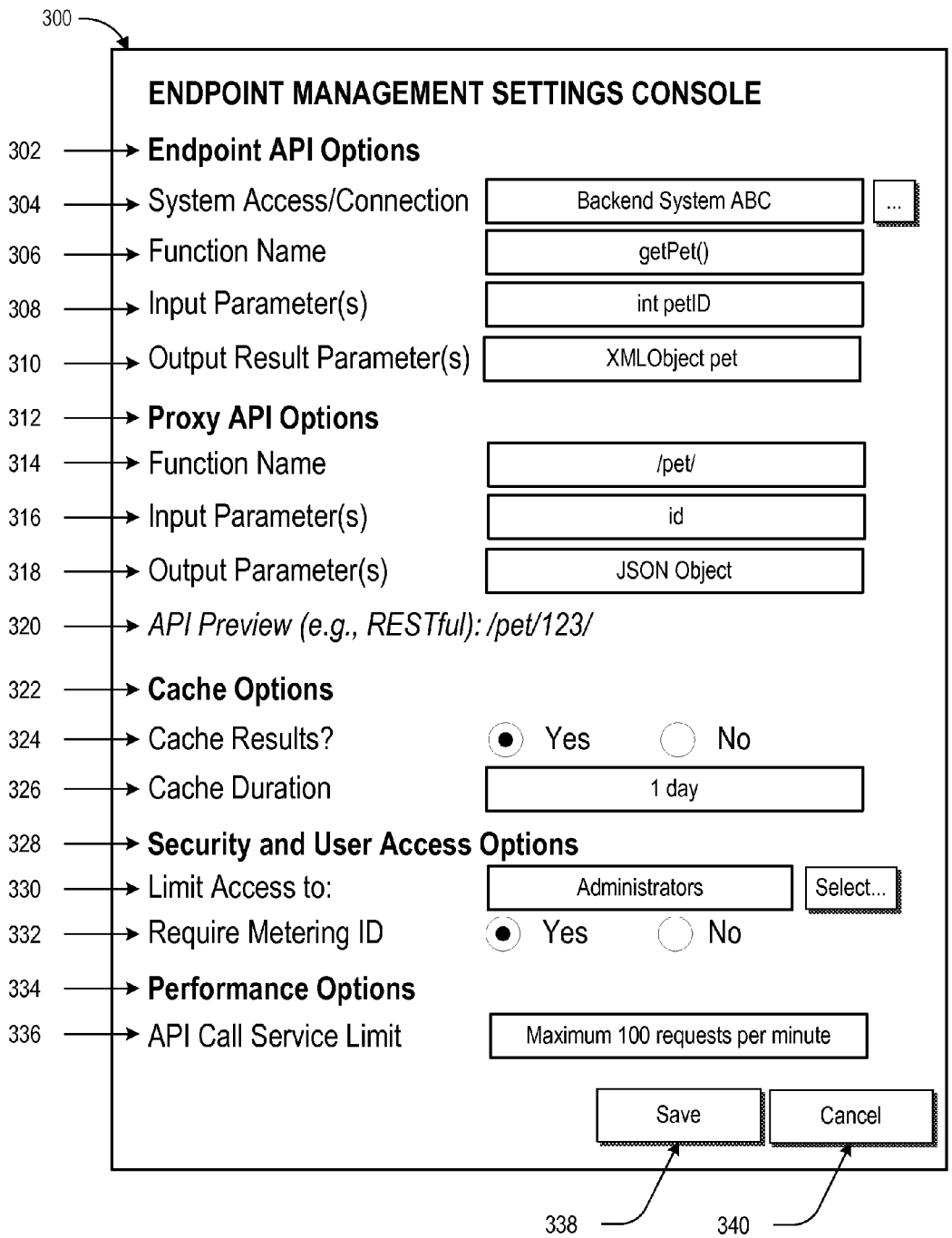
FIG. 3 depicts an example user interface which provides users with various endpoint management configuration options, according to an example aspect.

Turning now to FIG. 3, an example user interface 300 which provides users with various endpoint management configuration options in association with the endpoint management system 106 will be described. In various embodiments, the user interface 300 shown in FIG. 3 may be presented as a web page, as a mobile application display, as a stand-alone application display, as a popup window or dialog box, as an email message, or by other communication means. In other embodiments, analogous interfaces may be presented using audio or other forms of communication. In an embodiment, the interfaces shown in FIG. 3 is configured to be interactive and respond to various user interactions. Such user interactions may include clicks with a mouse, typing with a keyboard, touches and/or gestures on a touch screen, voice commands, and/or the like. The display elements shown in user interface 300 are merely for example purposes; more or less display elements and user input fields may be presented depending on the embodiment.

As shown, example user interface 300 includes a number of display elements (e.g., descriptions of various API mapping configuration option) and user input fields (e.g., text boxes, check or radio boxes, and so forth). At display element 302 the user interface presents a number of Endpoint API Options, including for example: a system access/connection setting (display element 304) and an associated text input field by which the user may specify a system or connection setting for the backend API; a function name (display element 306) and an associated text input field by which the user may specify the name of the backend API; input parameters (display element 308) and an associated text input field by which the user may specify one or more input parameters for the backend API; and output result parameters (display element 308) and an associated text input field by which the user may specify the type of output(s) provided by backend API.

At display element 312 the user interface presents a number of Proxy API Options, including for example: a function name (display element 314) and an associated text input field by which the user may specify the name of the proxy API; input parameters (display element 316) and an associated text input field by which the user may specify one or more input parameters for the proxy API; and output parameters (display element 318) and an associated text input field by which the user may specify the type of output(s) provided by proxy API.

At display element 322 the user interface presents a number of Cache Options, including for example: a cache results setting (display element 324) and an associated radio box selection user input field by which the user may specify whether output results should be cached by the endpoint management system; and a cache duration (display element 326) and an associated text input field by which the user may specify a duration for how long the cached results should remain valid.

At display element 328 the user interface presents a number of Security and User Access Options, including for example: a limit access setting (display element 330) and an associated text box user input field by which the user may specify users and/or groups permitted to call the proxy and/or associated backend API(s); and a metering identification requirement setting (display element 332) and an associated radio box selection field by which the user may specify whether a metering identifier requirement should be enforced or required for execution of the proxy API.

At display element 334 the user interface presents a number of Performance Options, including for example: an API call service limit setting (display element 336) and an associated text box user input field by which the user may specify a maximum number of backend API requests over a certain amount of time.

At display element 338, the user interface presents a save button to Save the API mapping definition and settings, which when selected by the user may cause the endpoint management system to save the API mapping definition in the endpoint/API mapping definitions data source 128. Display element 340 presents a Cancel button to cancel or end the current configuration without saving the API mapping or settings.

Another feature not illustrated in FIG. 3 which may be provided by the endpoint management system 106 may be an indicator that changes to an API mapping definition may result in a breaking change of the API mapping. For example, a change to the name, the input parameters, and/or the output parameters of the proxy API may comprise a breaking change, such that a calling system using the proxy API before the breaking change may no longer be able to use the proxy API without updating to the changed proxy API definition. For example, if the name of the proxy API is changed then a calling system will no longer be able to call the proxy API using the old name; or, if the number of required input parameters (and/or associated attributes) changes, then a calling system may not be able to call the proxy API using fewer inputs than are now required; and so on. In various instances the endpoint management system 106 may be configured to detect when a breaking change to an API proxy definition may occur and provide a warning or indicator to the user. The indicator may optionally include suggestions on how to address the breaking change (e.g., creating a new proxy API instead of changing an existing API; making new or modified input and/or output parameters optional; leaving existing attribute names or identifiers the same and only adding new attribute names or identifiers; and similar types of actions to maintain or preserve an existing API proxy mapping definition).

Figure 4A:
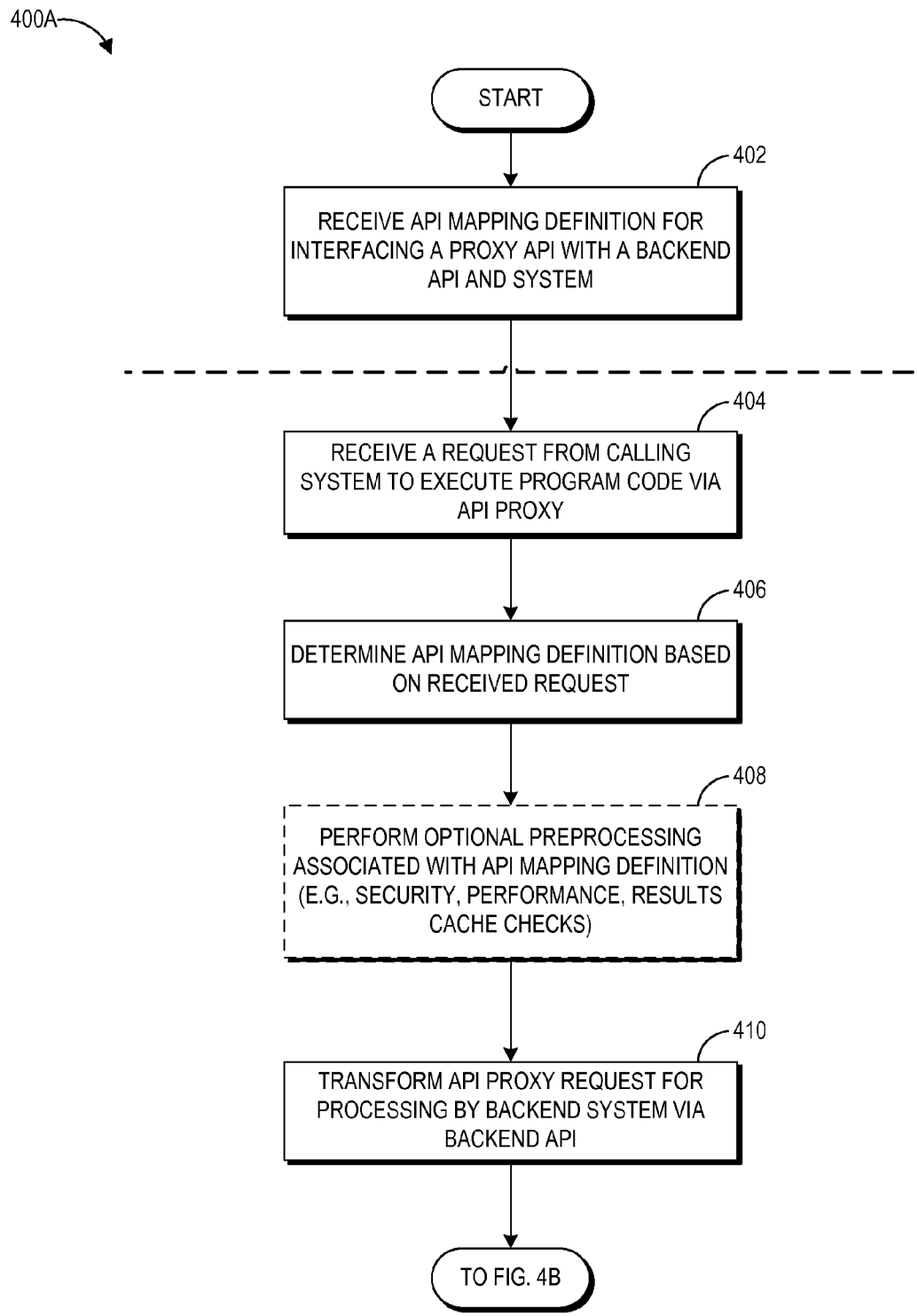
FIGS. 4A and 4B are flow diagrams illustrating an application programming interface proxy routine as implemented by an endpoint management system, according to an example aspect.

Turning now to FIG. 4A, a routine 400A implemented by one or more components of the endpoint management system 106 and/or the endpoint proxy system 132 (e.g., the response handler 108, the cache manager 120, the security manager 122, the performance unit 124, and/or the SDK generation service 126) will be described. Although routine 400A is described with regard to implementation by the endpoint management system 106, one skilled in the relevant art will appreciate that alternative components may implement routine 400A or that one or more of the blocks may be implemented by a different component or in a distributed manner.

At block 402 of the illustrative routine 400A, the endpoint management system 106 receives an API mapping definition for interfacing with a backend or endpoint API and associated backend system. The API mapping definition may be received for example via the user interface 300 illustrated and described herein with reference to FIG. 3. The API mapping definition may be stored for example in the endpoint/API mapping definitions data source 128. The API mapping definition may include a number of configuration options as described throughout this disclosure.

Next, at block 404, the endpoint proxy system 132 receives a request from a calling system to execute program code via an API proxy. The request may be received, for example, from a user computing device 102.

At block 406, the endpoint proxy system 132 determines an API mapping definition based on the received request. The determination may be based, for example, on various factors associated with the received request, including the name of the proxy API, input parameters associated with the proxy API, the calling system or requesting entity, any security or identification information provided with the request (such as an identification token, a metering identifier, or other identifier), and so forth.

At block 408, the endpoint proxy system 132 optionally performs some preprocessing associated with the API mapping definition. For example, in one embodiment the response handler 108 may determine whether the proxy API request has proper security identification and should be allowed to proceed. Or, in the same or another embodiment, the response handler 108 may interact with the cache manager 120 to determine whether a cached result is available and/or should be used to respond to the proxy API request. Or, in the same or another embodiment, the response handler 108 may interact with the performance unit 124 to determine whether the proxy API request should be allowed to proceed under current demand conditions. For example, in response to determining that a certain limit to the number of API requests to allow (as indicated in the API mapping definition) has been exceeded, the performance unit 124 may deny the proxy API request.

At block 410, the endpoint proxy system 132 transforms the API proxy request for processing by a backend system via a backend API as specified in the API mapping definition. For example, the API mapping definition may specify that one or more input parameters associated with the proxy API request are to be mapped, parsed, and/or transformed into one or more input parameters for the backend or endpoint API request. The endpoint proxy system 132 may also determine from the API mapping definition a particular backend system to which the backend API request is to be sent. Once this is complete, the routine 400A can proceed to block 412 of FIG. 4B.

Figure 4B:
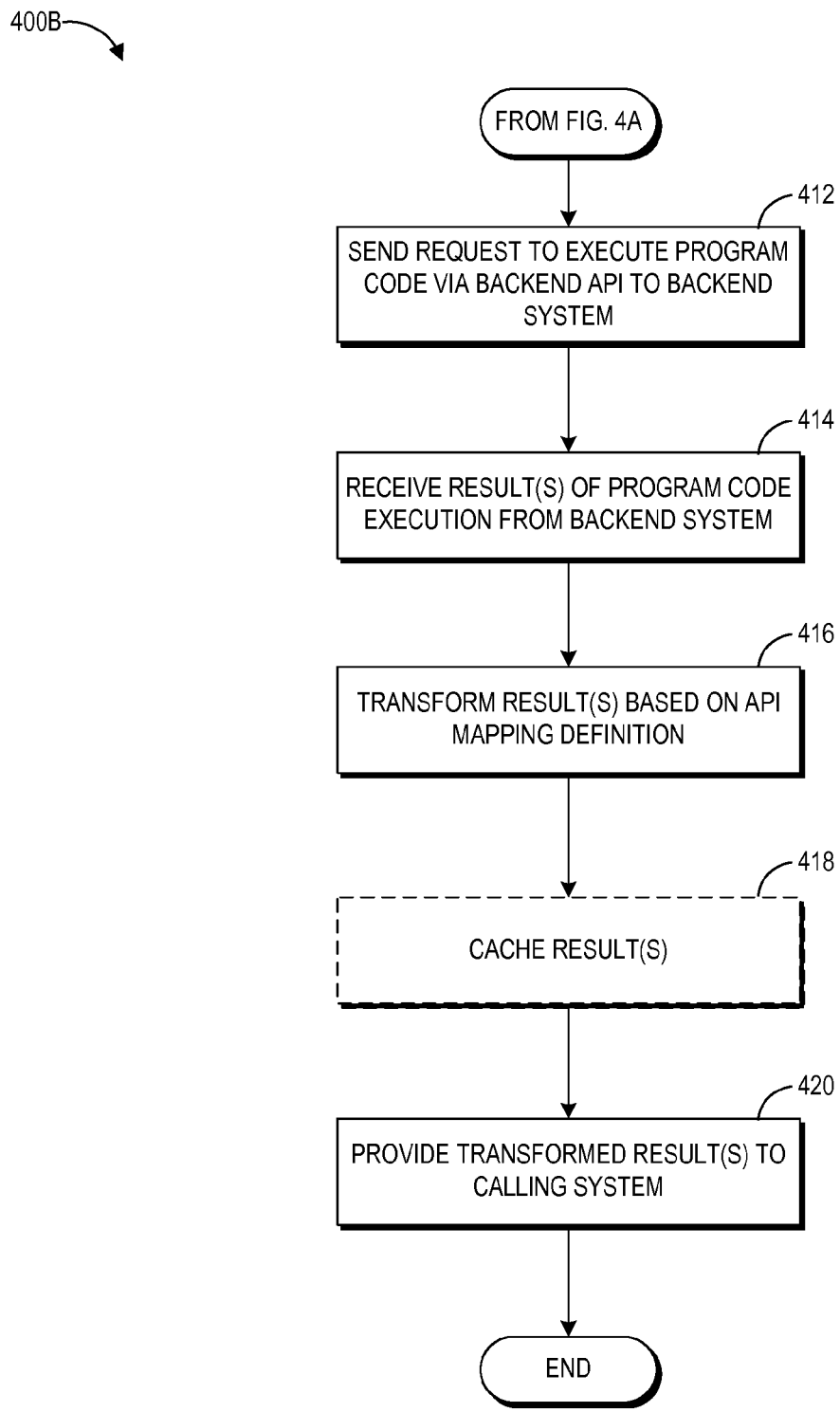

Turning now to FIG. 4B, the routine 400A continues with illustrative routine 400B. At block 412 of routine 400B, the endpoint proxy system 132 sends, to the particular backend system 114, a request to execute program code via the backend API. In some embodiments, the endpoint proxy system 132 may send multiple backend API requests associated with the proxy API request, which may be specified in the API mapping definition. The multiple backend API requests may be sent serially or in parallel depending on the particular configuration in the API mapping definition. For example, one API mapping definition may specify a workflow, wherein a single proxy API request corresponds to and involves multiple backend API requests, some of which may be independent (e.g., can be executed in parallel) and some of which may be dependent (e.g., execution of a second backend API may depend on the outcome results received from the execution of a first backend API, a scenario in which serial processing of the first backend API followed by execution of the second backend API may be necessary).

At block 414, the endpoint proxy system 132 receives results of the backend API request (e.g., from execution of the program code) from the particular backend system 114.

Next, at block 416, the endpoint proxy system 132 transforms the received results based at least in part on the API mapping definition. For example, the API mapping definition may specify that one or more result parameters associated with the backend API request are to be mapped, parsed, and/or transformed into one or more output result parameters for the proxy API request. For example, a result received from the backend system 114 may be in one format (e.g., an XML document) which is to be transformed into another format (e.g., a JSON object) according to the API mapping definition.

At block 418, the endpoint proxy system 132 optionally caches the received results and/or the transformed results. For example, the API mapping definition may include a user-specified configuration option indicating whether the received results and/or the transformed results (or both) should be cached, and if so, for how long. The results can be cached, for example, in the endpoint results cache 130, as discussed above.

At block 420, the endpoint proxy system 132 provides the transformed results to the calling system (e.g., a user computing device 102) in response to the received proxy API request. In some embodiments, the endpoint proxy system 132 may continue sending additional backend API requests associated with the proxy API request, which may be specified in the API mapping definition.

While the routine 400A-400B of FIGS. 4A-4B has been described above with reference to blocks 402-410 and 412-420, the embodiments described herein are not limited as such, and one or more blocks may be omitted, modified, or switched without departing from the spirit of the present disclosure.

Figure 5:
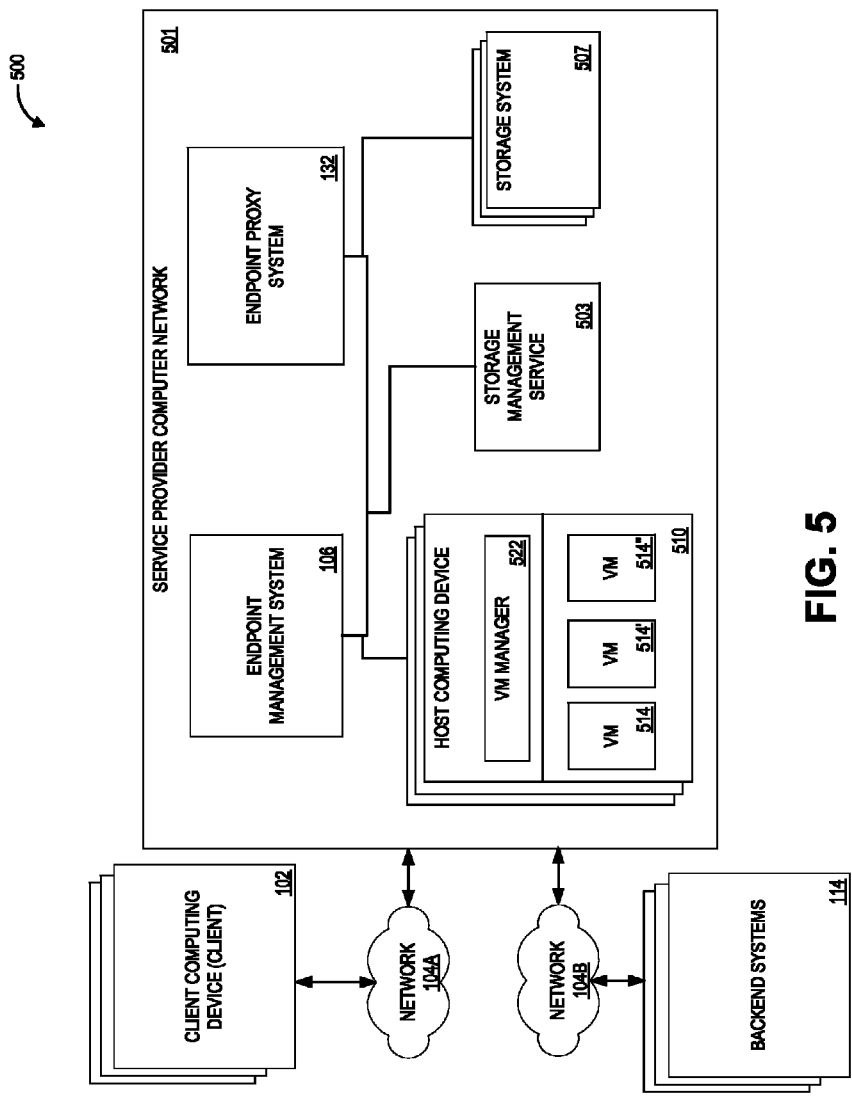
FIG. 5 is a block diagram illustrating an embodiment of a networked computing environment including a client computing device and a service provider computer network.

FIG. 5 is a block diagram illustrating an embodiment of a networked computing environment 500 including one or more client computing devices ("clients") 102 in communication with a service provider computer network 501 through a communication networks 104A and/or 104B. The networked computing environment 500 may include different components, a greater or fewer number of components, and can be structured differently. For example, there can be more than one service provider computer networks 501 so that hosting services or data storage services can be implemented across the multiple service provider computer networks 501 based, for example, on established protocols or agreements. As another example, the service provider computer network 501 may include more or fewer components and some components may communicate with one another through the communication networks 104A and/or 104B.

Illustratively, the client 102 can be utilized by a customer of the service provider computer network 501. In an illustrative embodiment, the client 102 includes necessary hardware and software components for establishing communications with various components of the service provider computer network 501 over the communication networks 104A and/or 104B, such as a wide area network or local area network. For example, the client 102 may be equipped with networking equipment and browser software applications that facilitate communications via the Internet or an intranet. The client 102 may have varied local computing resources such as central processing units and architectures, memory, mass storage, graphics processing units, communication network availability and bandwidth, etc. In one embodiment, the client 102 may have access to or control over a virtual machine instance hosted by the service provider computer network 501. The client 102 may also have access to data storage resources provided by the service provider computer network 501.

With continued reference to FIG. 5, according to one illustrative embodiment, the service provider computer network 501 may include interconnected components such as the endpoint management system 106, endpoint proxy system 132, one or more host computing devices 510, a storage management service 503, and one or more storage systems 507, having a logical association of one or more data centers associated with one or more service providers. The endpoint management system 106 may be implemented by one or more computing devices. For example, the endpoint management system 106 may be implemented by computing devices that include one or more processors to execute one or more instructions, memory, and communication devices to communicate with one or more clients 102 or other components of the service provider computer network 501. In some embodiments, the endpoint management system 106 is implemented on one or more servers capable of communicating over a network. In other embodiments, the endpoint management system 106 is implemented by one or more virtual machines in a hosted computing environment. Illustratively, the endpoint management system 106 can proxy API management and configuration and other relevant functionalities disclosed herein.

The endpoint proxy system 132 may also be implemented by one or more computing devices. In some embodiments, the endpoint proxy system 132 is implemented on one or more computing devices capable of communicating over a network. In other embodiments, the endpoint proxy system 132 is implemented by one or more virtual machines instances in a hosted computing environment. The endpoint proxy system 132 may receive and respond to electronic requests to execute proxy APIs and communicate with backend systems 114 as described herein.

Each host computing device 510 may be a physical computing device hosting one or more virtual machine instances 514. The host computing device 510 may host a virtual machine instance 114 by executing a software virtual machine manager 122, such as a hypervisor, that manages the virtual machine instance 114. The virtual machine instance 114 may execute an instance of an operating system and application software.

In some embodiments, host computing devices 510 may be associated with private network addresses, such as IP addresses, within the service provider computer network 501 such that they may not be directly accessible by clients 102. The virtual machine instances, as facilitated by the virtual machine manager 122 and endpoint management system 106, may be associated with public network addresses that may be made available by a gateway at the edge of the service provider computer network 501. Accordingly, the virtual machine instances 514 may be directly addressable by a client 102 via the public network addresses. One skilled in the relevant art will appreciate that each host computing device 510 would include other physical computing device resources and software to execute multiple virtual machine instances or to dynamically instantiate virtual machine instances. Such instantiations can be based on a specific request, such as a request from a client 102.

The storage management service 503 can be associated with one or more storage systems 507. The storage systems 507 may be servers used for storing data generated or utilized by virtual machine instances or otherwise provided by clients. Illustratively, the storage management service 503 can logically organize and maintain data in data storage volumes. For example, the storage management service 503 may perform or facilitate storage space allocation, input/output operations, metadata management, or other functionalities with respect to volumes.

In some embodiments, a volume may be distributed across multiple storage systems, may be replicated for performance purposes on storage systems in different network areas. The storage systems may be attached to different power sources or cooling systems, may be located in different rooms of a datacenter or in different datacenters, or may be attached to different routers or network switches.

In an illustrative embodiment, host computing devices 510 or storage systems 507 are considered to be logically grouped, regardless of whether the components, or portions of the components, are physically separate. For example, a service provider computer network 501 may maintain separate locations for providing the host and storage components. Additionally, the host computing devices 510 can be geographically distributed in a manner to best serve various demographics of its users. One skilled in the relevant art will appreciate that the service provider computer network 501 can be associated with various additional computing resources, such additional computing devices for administration of content and resources, and the like.

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing endpoint management of application programming interfaces, the system comprising:
an electronic data store configured to store application programming interface ("API") mapping definitions that map a plurality of proxy APIs associated with an endpoint system to a plurality of endpoint APIs associated with an endpoint API system in communication with the endpoint system; and
the endpoint system comprising one or more hardware computing devices executing specific computer-executable instructions, wherein the endpoint system is in communication with the electronic data store, and configured to at least:
receive the API mapping definitions, wherein each respective API mapping definition associates a proxy API with at least one endpoint API;
receive a request from a calling system to execute a particular proxy API;
determine, based at least in part on the received request and the particular proxy API, an API mapping definition associated with the particular proxy API and an endpoint API corresponding to the particular proxy API;
transform the request into an endpoint request for processing by the endpoint API system, wherein the request is transformed based at least in part on the API mapping definition and wherein the endpoint request includes an instruction to execute the endpoint API on the endpoint API system;

transmit the endpoint request to the endpoint API system to cause execution of the endpoint API on the endpoint API system;

receive an endpoint result from the endpoint API system, wherein the endpoint result is generated from the execution of the endpoint API on the endpoint API system;

transform the endpoint result into a proxy result, wherein the endpoint result is transformed based at least in part on the API mapping definition; and provide a return response to the calling system, wherein the return response comprises at least the proxy result.

2. The system of claim 1, wherein the endpoint system is further configured to store a copy of the endpoint result in a second electronic data store configured to store cached results received from respective endpoint API systems.

3. The system of claim 1, wherein the endpoint system is further configured to access a cached copy of the endpoint result from a second electronic data store configured to store cached results received from respective endpoint API systems.

4. A system, comprising:
an endpoint proxy system comprising one or more hardware computing devices adapted to execute specific computer-executable instructions and in communication with an electronic data store configured to store application programming interface ("API") mapping definitions that map a plurality of proxy APIs associated with the endpoint proxy system to a plurality of backend APIs associated with a backend system in communication with the endpoint proxy system, wherein the endpoint proxy system is configured to at least:
receive a request from a user computing device to execute a proxy API;
determine a specific API mapping definition based at least in part on the received request, the API mapping definitions, and the proxy API;
transform the request into a backend request for processing by the backend system, wherein the request is transformed based at least in part on the specific API mapping definition, wherein the backend request includes an instruction to execute a backend API associated with the specific API mapping definition on the backend system;
transmit the backend request to the backend system, wherein the backend request is adapted to cause execution of the backend API on the backend system;
receive a backend result from the backend system, wherein the endpoint result is generated by execution of the backend API on the backend system;
transform the backend result into an output result, wherein the backend result is transformed based at least in part on the specific API mapping definition; and
provide the output result to the user computing device.

5. The system of claim 4, wherein the endpoint proxy system is further configured to store a copy of the backend result in a second electronic data store configured to store cached results received from respective backend systems.

6. The system of claim 5, wherein the endpoint proxy system is further configured to store the copy of the backend result in the second electronic data store according to a cache duration setting associated with the specific API mapping definition.

7. The system of claim 4, wherein the endpoint proxy system is further configured to access a cached copy of the backend result from a second electronic data store configured to store cached results received from respective backend systems.

8. The system of claim 4, wherein the specific API mapping definition comprises at least associated configuration settings for the proxy API and associated configuration settings for the backend API.

9. The system of claim 8, wherein the associated configuration settings for the proxy API comprises a proxy API name, a proxy API input parameter, and a proxy API output result type.

10. The system of claim 8, wherein the associated configuration settings for the backend API comprises a backend API name, a backend API input parameter, and a backend API output result type.

11. The system of claim 4, wherein the request to execute the proxy API is received from the user computing device over a first network and the backend result is received from the backend system over a second network, wherein the second network is separate and distinct from the first network.

12. The system of claim 11, wherein the endpoint proxy system and the backend system are co-located on the second network.

13. A computer-implemented method comprising:
as implemented by one or more computing devices configured with specific executable instructions,
receiving a request from a calling system to execute a first proxy application programming interface ("API") of a plurality of proxy APIs associated with an endpoint proxy system, wherein the plurality of proxy APIs are mapped, by API mapping definitions, to a plurality of backend APIs associated with a backend system in communication with the endpoint proxy system;
determining a first API mapping definition based at least in part on the received request, the API mapping definitions, and the first proxy API;
transforming the request into a backend request for processing by the backend system, wherein the request is transformed based at least in part on the first API mapping definition, wherein the backend request includes an instruction to execute a first backend API associated with the first API mapping definition on the backend system;
sending the backend request to the backend system, wherein the backend request is adapted to cause execution of the first backend API on the backend system;
receiving a first backend result from the backend system, wherein the first backend result is generated by execution of the backend API on the backend system;
transforming the first backend result into an output result, wherein the first backend result is transformed based at least in part on the first API mapping definition; and
providing the output result to the calling system.

14. The computer-implemented method of claim 13, further comprising storing a copy of the first backend result in a second electronic data store configured to store cached results received from respective backend systems.

15. The computer-implemented method of claim 13, further comprising:
receiving a second request to execute a second proxy API; and
determining, based at least in part on the received second request, the API mapping definitions, and the second proxy API, a second API mapping definition associated with the second proxy API.

16. The computer-implemented method of claim 15, further comprising:
determining, based on the second API mapping definition, that the second proxy API is mapped to the first backend API; and
accessing a cached copy of the first backend result from a second electronic data store configured to store cached results received from respective backend systems.

17. The computer-implemented method of claim 15, further comprising:
determining, based on the second API mapping definition, that the second proxy API is mapped to a second backend API, wherein the second backend API is configured to return a second backend result that is a subset of the first backend result generated by execution of the backend API;
accessing a cached copy of the first backend result from a second electronic data store configured to store cached results received from respective backend systems; and
providing a transformed output result of the cached copy to the calling system.

18. A computer-readable, non-transitory storage medium storing computer executable instructions that, when executed by one or more computing devices, configure the one or more computing devices to perform operations comprising:
receiving a request from a calling system to execute a specific proxy application programming interface ("API") of a plurality of proxy APIs associated with an endpoint proxy system, wherein the plurality of proxy APIs are mapped, by API mapping definitions, to a plurality of backend APIs associated with a backend system in communication with the endpoint proxy system;
determining a specific API mapping definition based at least in part on the received request, the API mapping definitions, and the specific proxy API;
transforming the request into a backend request for processing by the backend system, wherein the request is transformed based at least in part on the specific API mapping definition, wherein the backend request includes an instruction to execute a backend API associated with the specific API mapping definition on the backend system;
sending the backend request to the backend system, wherein the backend request is adapted to cause execution of the backend API on the backend system;
receiving a backend result from the backend system, wherein the backend result is generated by execution of the backend API on the backend system;
transforming the backend result into an output result, wherein the backend result is transformed based at least in part on the specific API mapping definition; and
providing the output result to the calling system.

19. The computer-readable, non-transitory storage medium of claim 18, wherein the operations further comprise storing a copy of the backend result in a second electronic data store configured to store cached results received from respective backend systems.

20. The computer-readable, non-transitory storage medium of claim 18, wherein the operations further comprise determining, based at least in part on an authorization setting associated with the specific API mapping definition, that a user identifier associated with the request to execute the specific proxy API is included in the specific API mapping definition as an authorized user or group.

21. The computer-readable, non-transitory storage medium of claim 18, wherein the operations further comprise determining that the request to execute the specific proxy API is allowed to proceed based at least in part on comparison of a performance throttling setting associated with the specific API mapping definition to a current API request workload associated with the backend system.

22. The computer-readable, non-transitory storage medium of claim 18, wherein the specific API mapping definition comprises at least associated configuration settings for the specific proxy API and associated configuration settings for the backend API.

23. The computer-readable, non-transitory storage medium of claim 18, wherein the specific proxy API is associated with a first protocol and the backend API is associated with a second protocol.

* * * * *

UNITED STATES PATENT AND TRADEMARK OFFICE
CERTIFICATE OF CORRECTION

PATENT NO. : 9,930,103 B2
APPLICATION NO. : 14/682033
DATED : March 27, 2018
INVENTOR(S) : Jonathan Paul Thompson Page 1 of 1

It is certified that error appears in the above-identified patent and that said Letters Patent is hereby corrected as shown below:

In the Claims

In Column 17, Line 57, Claim 4, delete "endpoint" and change to --backend--.

Signed and Sealed this
Thirtieth Day of April, 2019

Andrei Iancu
*Director of the United States Patent and Trademark Office*